Oct. 28, 1969   JINGO SETO   3,475,526
METHOD FOR CUTTING-FORMING OF THERMOPLASTIC SHEETS
Filed Dec. 21, 1965   2 Sheets-Sheet 1

Oct. 28, 1969 JINGO SETO 3,475,526
METHOD FOR CUTTING-FORMING OF THERMOPLASTIC SHEETS
Filed Dec. 21, 1965 2 Sheets-Sheet 2
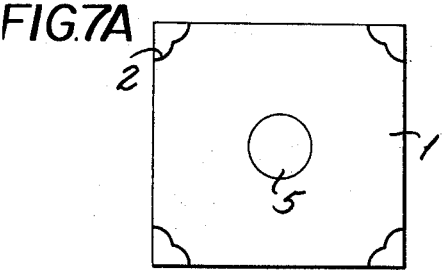
FIG.7A
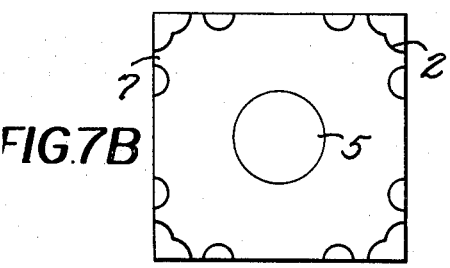
FIG.7B
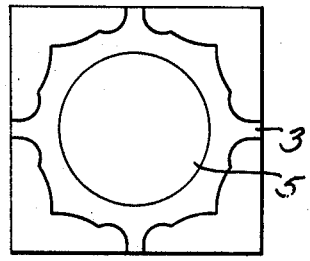
FIG.7C
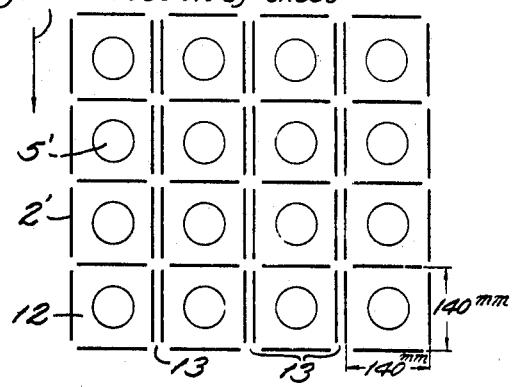
FIG.8B
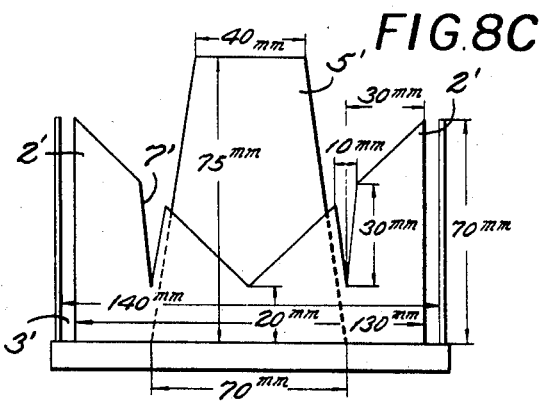
FIG.8C
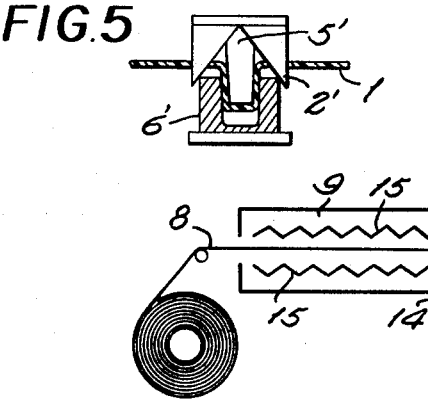
FIG.5
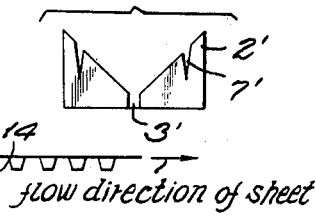
FIG.6
FIG.8A United States Patent Office 3,475,526
Patented Oct. 28, 1969

3,475,526
METHOD FOR CUTTING-FORMING OF
THERMOPLASTIC SHEETS
Jingo Seto, 29—6, 3-chome, Akatsuka-Shinmachi,
Itabashi-ku, Tokyo, Japan
Filed Dec. 21, 1965, Ser. No. 515,394
Int. Cl. B29d 27/00; B29c 3/00
U.S. Cl. 264—153                5 Claims

ABSTRACT OF THE DISCLOSURE

A method in which a sheet of thermoplastic material is gradually and successively cut along the periphery of a predetermined region of the sheet while concurrently a central part of the region is gradually formed into the shaped article.

This invention relates to a novel method adapted for forming thermoplastic sheets while cutting specific portions thereof by using dies and applying a vacuum or mechanical pressure following heating of the materials with heaters, and in particular the method is adapted for the forming of foamed polystyrene sheets, foamed vinyl sheets, foamed polyethylene sheets, and the like, whereby deep-drawn products having large wall thicknesses such as cups can be manufactured from those sheets easily at low cost, overcoming the difficulties hitherto involved in such operation.

According to conventional forming methods, a sheet is simply rendered plastic by heating, dies are arranged within the ranges permissible in the light of the plasticity of the specific sheet, and then the heated sheet is formed into shaped articles by suction or compression in the dies. In this case, sheet portions around the dies are first stretched to some extent because of their plasticity and then the stretched portions are forced into the cavity to participate in the formation of the desired article, but most of the surrounding portions are left outside the dies as waste. With such conventional forming methods, sheets having high formability and plasticity, e.g. polystyrene and vinyl chloride sheets, can be formed as deep-drawn articles the depths of which are considerable, e.g. cups. However, foamed sheets of the same materials which are made by enclosing some gas therein for economic use of the materials contained a large number of independent gas bubbles or are made porous, and hence are very poor in plasticity and extensibility as required for the forming of those sheets by means of press, vacuum, or the like. Thus, great difficulties have been encountered by the conventional methods in making deep-drawn articles having large wall thickness.

An object of the present invention is to provide a method specifically developed for economical deep-drawing of foamed thermoplastic sheets having low plasticity as mentioned above, which comprises the steps of predetermining a certain area on the sheet for an article to be formed, thereafter carrying out the forming while cutting part or all of the periphery of the sheet-area in specific parts so as to make up for insufficient plasticity of the foamed sheet, and then allowing most of the predetermined sheet-area to be able to take part in the formation of the deep-drawn articles.

It is another object of the invention to provide a method for obtaining shallow-drawn articles from thin foamed sheets in an easier and more economical way than heretofore.

In the accompanying drawings:

FIG. 5 is a schematic side view, illustrating the operation in accordance with the invention;

FIG. 6 is a side view of cutting blades adapted to leave certain portions of the sheet uncut for a certain period of time during the cutting-forming operation;

FIGS. 7A–C illustrate the sequence of the cutting-forming operation from the start of cutting of the sheet with cutting blades having V-shaped notches to the completion of said operation;

FIG. 8A is a schematic side view of a cutting-forming machine;

FIG. 8C is a side view of a cutting-forming unit; and

FIG. 8B is a plan view of an arrangement of cutting-forming units.

Figure 1A:
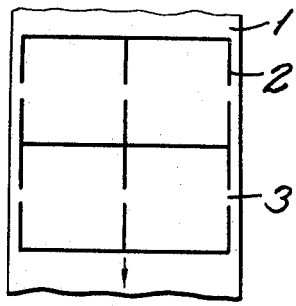
FIG. 1A is a plan view diagrammatically showing cutting lines in a sheet.
Figure 1B:
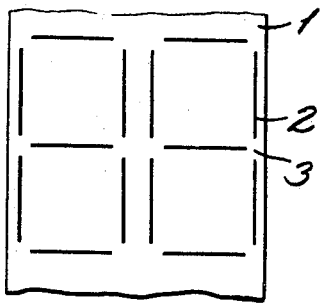
FIG. 1B is a plan view similar to FIG. 1A showing different cutting lines in the sheet.
Figure 2A:
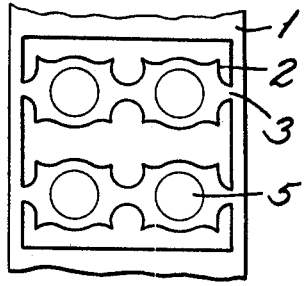
FIGS. 2A and 2B are plan views of the sheet in FIGS. 1A and 1B after the cutting-forming operation of this invention.
Figure 3A:
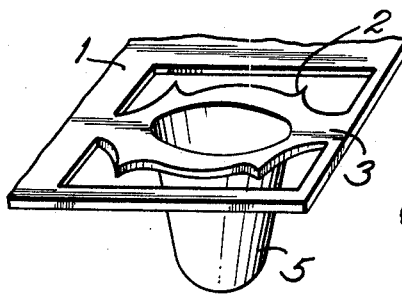
FIGS. 3A and 3B are perspective views of the formed articles and surrounding material in FIGS. 2A and 2B respectively.
Figure 3B:
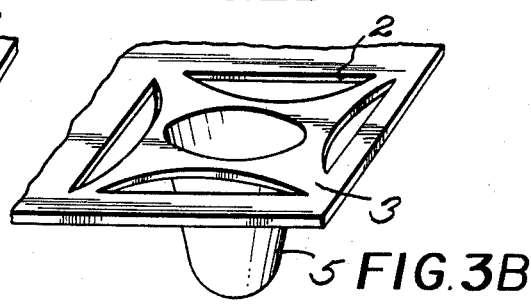

Referring now to FIGS. 1A and 1B of the accompanying drawing, therein are shown cutting lines 2 along which the sheets 1 are cut to obtain four predetermined sheet-areas for forming four articles as indicated at 5 in FIGS. 3A and 3B. After the forming, the sheets will look, respectively, as shown in FIGS. 2A and B. Numeral 3 designates connecting portions of the sheet which are left uncut. As seen in FIGS. 2A and B the sheet is cut along the major part of the periphery of the predetermined sheet area and the latter is substantially larger than the area of the open end of formed article 5. For convenience in taking out the formed articles, usually two or more such connecting portions 3 are left for each die. They may be omitted in cases where such a means of taking the formed articles from the dies is not required.

Figure 2B:
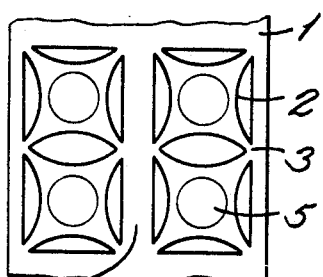

In continuous manufacture of formed articles from a roll of sheet, foamed polystyrene sheet or the like tends to shrink by heating, and when the sheet is cut for forming as in FIG. 2A, the portion of the sheet still within a heating furnace and which is to be formed subsequently shrinks toward the inside of the furnace and becomes unable to maintain the regular shape. To provide a resistance to this shrinkage, a sheet-holding portion 4 is left on the sheet as shown in FIG. 2B.

Figure 4A:
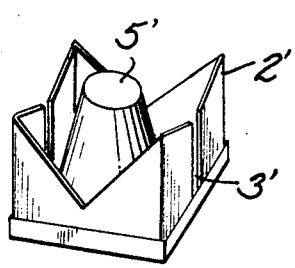
FIGS. 4A and 4B are respective perspective views of cutting blades adapted for making cuts along the cutting lines shown in FIGS. 1A and B.
Figure 4B:
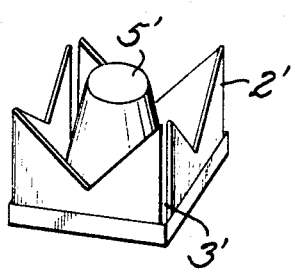

In FIGS. 4A and B, there are shown examples of forming units consisting of cutting-blades 2', male die 5', and spacing portions 3' for leaving the connections 3 uncut, said forming units being adapted to accomplish the cutting-forming as above described in combination with female dies.

FIG. 5 illustrates how a sheet 1 is cut and shaped by the forming unit in FIG. 4A in cooperation with a female die 6'.

FIG. 6 shows an example of cutting blades 2' having V-shaped notches 7' the size of which are determined depending on the intended depth, shape, etc. of the desired articles. The functions and effects of the V-shaped notches are illustrated in FIGS. 7A, B, and C. The condition in FIG. 7A represents the start of the cutting-forming of this invention. First, the portion 5 of the predetermined sheet-area begins to be pressed into the cavity of the female die 6' while the remaining portions which surround the portion 5 begin to be stretched. By the action of the cutting blades 2', the remotest portions, usually four corner-portions of the predetermined sheet-area of the sheet are cut through first. Then, the sheet portions on and close to the straight lines between the four corners and the die begins to be forced into the die. In the forming of some articles which have certain depths and shapes, it will become impossible to obtain the desired shaped goods if the cutting is continued with cutting blades without notches therein, because the remaining portions to be subsequently formed adjacent to the cut portions have no resistance to the tension exerted by the dies and the sheet is forced into the dies without being stretched. Therefore, the provision of the V-shaped notches 7' having suitable widths and depths in suitable positions of the cutting blades makes it possible to leave sheet portions opposite the V-shaped notches uncut at first and to leave the tension-resistive portions 7 in FIG. 7B intact, so that the latter can provide suitable resistances thereby permitting introduction of the sheet into the dies while being stretched and also preventing excessive introduction of the sheet thereinto. Also, depending on correlative conditions between the types of dies and cutting lines, the sheets may sometimes form fairly large flares of creases on them as they are pressed into the dies. However, a suitable number of V-shaped notches provided in suitable positions serve to make the flares branch and divide into numerous minute parts thereof so that they come to be unrecognizable as flares, and preclude any adverse effects upon the articles produced. In such way the cutting work is controlled suitably and effected until the sheet reaches the lower ends of the V-shaped notches, when the tension resistive portions 7 also are cut off to take part in the forming of the article. Eventually, most of the predetermined sheet-area of the sheet can be included in the formed article, with a necessary minimum of waste portions around the product, as shown in FIG. 7G. Thus, by press-forming as shown in FIG. 5, or by vacuum forming wherein the female die 6' in the same figure is replaced with a suitable frame structure and then the sheet is attracted onto the male die by means of a vacuum pressure exerted therefrom, even a foamed sheet or the like having low plasticity can be formed with controlled stretching thereof to give desired shaped products. Hence deep-drawn, thick-wall articles can be manufactured with great ease and economy because most of the material can be included in the product with a minimum of material loss.

As described hereinbefore, the present invention permits most of the sheet portions, that have not hitherto been used but wasted in the conventional formation of secondary articles, to become part of the body of the product by the method which comprises suitable successive cutting simultaneously with press or vacuum forming as mentioned above, and thus the invention makes it possible to accomplish deep drawing of low plasticity materials, and further to produce thick-wall articles because the stretchability of the materials can be adequately controlled.

EXAMPLE 1

A roll of foamed polystyrene sheet 8, one millimeter thick and 635 mm. wide, was placed on an automatic forming machine as shown diagrammatically in FIG. 8 which is so set that the material is transferred successively over a distance of 600 mm. every cycle of operation. The sheet was passed through an electric heating furnace 9, 1.5 meters long and heated at 120° to 125° C., for about 15 seconds, to reach a temperature of 105° to 110° C. and be rendered plastic and at the same time the polystyrene was by the phenomenon of so-called secondary foaming. With a consequent increase of 2 to 3 mm. in the thickness on foaming, the sheet was then moved to a position where it was to be formed. Press cylinders 10 and 11 having a combined pressure capacity of 5 tons were disposed above and below the sheet for forming the same. Secured to the bottom end of the upper cylinder 10, are sixteen forming units as illustrated in FIG. 8B were fixed. The male die of each forming unit, as indicated at 5' in FIG. 8C, was a cylindrical shape, 75 mm. high, with a top diameter of 40 mm. and a root diameter of 70 mm. The die was intended to form the inner surface of a cup to be manufactured. Made of aluminum, it was hollow inside and provided with 20 minute holes, 1 mm. in diameter, scattered as air vents which communicate the hollow with the die surface. As shown in FIG. 8C, each of the cutting blades 2' fixed around the male die was 130 mm. in length at the base, 70 mm. in height at its crest, and 20 mm. at its root. Since deep-drawn articles were intended to be formed in this example, each cutting blade was provided with V-shaped notches, 10 mm. wide at the top and 30 mm. in depth, the notches being 30 mm. from the blade edges for the purposes of removing flares and creases in the formed articles and of obtaining a tension resistance during the forming. For convenience in cutting, the cutting blades were each equipped with a 200 w. electric heater wire so that it could be heated at 180° C. The area of the sheet to be formed for each set of the cutting blade was 140 mm.$^2$ and the width of each of the connecting portions to be left uncut on the four corners was about 7 mm. Assuming that the direction of advancement of the sheet was longitudinal, four such forming units 12 were successively arranged in the longitudinal direction as shown in FIG. 8B. As the width of the sheet-holding portions as indicated at 4 in FIG. 2B was 15 mm. in this case, four rows of the units, each consisting of four units connected longitudinally, were arranged transversely at intervals of 15 mm. in FIG. 8B. Thus, on a sheet-area 635 mm. wide and 600 mm. long (the length of the sheet fed every cycle of forming), that is, 635 mm. by 600 mm., sufficient to-be-formed areas were obtained for the 16 forming units, 3 sheet-holding portions 13 which are each 15 mm. in width, and margins, 15 mm. each, on both sides for clamping the sheets for transfer and other purposes. Although the length of sheet actually required in the longitudinal or moving direction was 140 mm. x 4 =560 mm., margins, each 20 mm. long in the same direction were preferably added to said length in order to secure the sheet in place by holding the margins at both edges with clamp shutters 14, i.e. one shutter near the furnace and the other remote from the furnace. Immediately below each of the forming units composed of the male dies and downwardly facing cutting blades is a female die designated at 6' in FIG. 8A. Made of aluminum, it was 73 mm. in the diameter of the top opening, 47 mm. in the bottom diameter, and 76 mm. in depth. Its portions surrounding the cavity were hollow and twenty minute holes, 1 mm. in diameter, were provided on the cavity walls as air vents which communicate the surrounding portions with the die cavity 13. Such female dies (sixteen in number) were mounted on the top of the lower cylinder 11. With a forming pressure of 5 tons, the sheet was pressed into shaped articles. In the gaps defined by the male and female dies, sixteen cups of uniform and predetermined wall thicknesses, i.e. with wall thickness at the opening of 1.5 mm. and bottom wall thickness of 1 mm., were obtainable in a single operation. The cups were produced successively. In this example, the specific gravity of the foamed polystyrene sheet used was 0.013, and each piece of the 1 mm.-thick sheet, with a forming area of 140 mm.$^2$, weighed about 2.55 g. The weight of each product was 2 g.

EXAMPLE 2

In contrast to Example 1 wherein one of procedures for deep-drawing forming according to the invention is illustrated, shallow-drawing was carried out in this Example. A foamed polystyrene sheet, with a specific gravity of 0.013 and thickness of 0.75 mm., was used in the manufacture of ice cream containers, each with a general wall thickness of 0.75 mm., opening diameter of 60 mm., bottom diameter of 55 mm., and depth of 38 mm.

Male and female dies as employed in Example 1 were made of aluminum with gaps therebetween as required in the formation of ice cream containers as above described. Each die was provided with ten minute holes, 1 mm. in diameter, as air vents. The cutting blades used were constructed such that a portion could be left uncut as a connector were at each of the four corners throughout forming, as in Example 1. Since shallow drawing calls for no V-shaped notch for removal of flares or creases, the cutting blades were not provided with such notches. The crest height of each cutting blade was 45 mm., the root height was 20 mm., and the length was 100 mm. Each cutting blade was equipped with a 100 w. heating wire, and was heated to 180° C. in the same manner as described in Example 1. The forming area was predetermined to be 110 mm.², and the connecting portions formed at the four corners were about 7 mm. wide each. As in the preceding example, the sheet-holding portions were 15 mm. wide. Thus, five forming units were connected in a row in the longitudinal direction of the sheet, and five rows were arranged side by side with a space of 15 mm. between one another. In all, 25 forming units were arranged over a forming area of 630 mm. in width by 590 mm. in feedable length. In the same manner as in Example 1, the forming units and the female dies were secured to the upper and lower cylinders, respectively, and when the sheet was pressed with a combined pressure of 5 tons, twenty-five ice cream containers of the dimensions as mentioned above could be obtained readily in a single operation. In this case the temperature of the heating furnace was set at between 110° and 115° C. Through the furnace, the foamed polystyrene sheet, 0.75 mm. in thickness was passed over a period of about 15 seconds, whereby the sheet was heated to about 105° C., and was secondarily foamed to a thickness of about 1.7 mm., while attaining a sufficient plasticity for the forming in accordance with the invention. Each area to be formed of 110 mm.² weighed 1.2 g., and each product weighed about 0.9 g.

What is claimed is:

1. In a method for forming a thermoplastic sheet of low plasticity into deep drawn articles, the improvement comprising completely cutting through a thermoplastic sheet of low plasticity in a restricted portion of the periphery of a predetermined area of the sheet from which an article is to be formed, deforming a central portion of said area during said cutting, and continuing the cutting along said periphery while deforming the sheet to progressively separate said area from the remainder of the sheet and enable the continued deformation of the sheet in said central area by allowing most of the predetermined area of the sheet to take part in the deformation.

2. A method as claimed in claim 1 wherein the continued cutting of the sheet along said periphery is effected until at the end of the deforming operation only a relatively small uncut portion remains between said area and the remainder of the sheet.

3. A method as claimed in claim 2 wherein a plurality of articles are produced in the same sheet simultaneously, the individual areas being separately cut in the sheet to leave separate shaped articles interconnected by the uncut portions of the sheet.

4. A method as claimed in claim 1 wherein during the cutting of the sheet along said periphery a relatively small portion is left uncut between said area and the remainder of the sheet to provide tension resistive portions therebetween, said tension resistive portions being ultimately severed at a later period of the deforming operation.

5. A method as claimed in claim 1 wherein the cutting is effected with tapered blades to insure gradual increase of the length of the cuts made in the sheet.

References Cited

UNITED STATES PATENTS

| | | | |
|---|---|---|---|
| 2,691,797 | 10/1954 | Bertleff | 264—163 |
| 3,294,881 | 12/1966 | Wadlinger | 264—163 X |
| 2,120,328 | 6/1938 | Ferngren | 264—163 X |
| 2,386,147 | 10/1945 | Sidebotham | 83—40 |
| 2,423,601 | 7/1947 | MacArthur | 83—689 X |
| 3,007,201 | 11/1961 | Brummer | 264—153 |
| 3,011,212 | 12/1961 | Marshall | 18—19 |
| 3,220,902 | 11/1965 | Edwards | 264—321 |
| 3,261,456 | 7/1966 | Sparks | 264—321 X |
| 3,339,006 | 8/1967 | Collins | 264—321 |
| 3,342,915 | 9/1967 | Wanderer | 264—92 |

FOREIGN PATENTS 551,569 3/1943 Great Britain.

ROBERT F. WHITE, Primary Examiner

S. I. LANDSMAN, Assistant Examiner

U.S. Cl. X.R.

18—19; 83—689; 264—92, 163, 321